United States Patent
Lawrence

[11] 3,891,069
[45] June 24, 1975

[54] BRAKE SHOES

[75] Inventor: Raymond Keith Lawrence, Birmingham, England

[73] Assignee: Girling Limited, Birmingham, England

[22] Filed: Nov. 26, 1973

[21] Appl. No.: 418,874

Related U.S. Application Data

[63] Continuation of Ser. No. 281,404, Aug. 17, 1972, abandoned, which is a continuation of Ser. No. 82,703, Oct. 21, 1970, abandoned.

[30] Foreign Application Priority Data

Nov. 21, 1969 United Kingdom............ 57010/69

[52] U.S. Cl........ 188/250 G; 188/250 H; 192/107 T
[51] Int. Cl................................................. F16d 69/04
[58] Field of Search........ 188/250 R, 250 A, 250 B, 188/250 C, 250 D, 250 E, 250 F, 250 G, 250 H, 1 A; 102/75, 76, 107 T

[56] References Cited
UNITED STATES PATENTS

| | | | |
|---|---|---|---|
| 1,771,594 | 7/1930 | Thompson | 188/250 C |
| 1,781,074 | 11/1930 | Norton | 188/250 R |
| 2,582,755 | 1/1952 | Kenny | 192/107 T |
| 3,001,622 | 9/1961 | Goldberg | 192/76 |

FOREIGN PATENTS OR APPLICATIONS

| | | | |
|---|---|---|---|
| 700,534 | 12/1953 | United Kingdom | 188/250 G |
| 608,876 | 4/1926 | France | 188/250 G |
| 918,266 | 2/1947 | France | 188/250 D |

*Primary Examiner*—George E. A. Halvosa
*Assistant Examiner*—Edward Kazenske
*Attorney, Agent, or Firm*—Scrivener Parker Scrivener and Clarke

[57] ABSTRACT

A brake shoe for a drum brake of the type wherein the lining is attached to a carrier solely by being integrally moulded thereto without the use of rivets or other mechanical fastening device. The carrier is provided with a flat central part and outwardly inclined wings defining a shallow trough in cross-section. The wings have circumferentially spaced radially inward unbroken depressions therein. The concave cross-section of the carrier keys the lining against axial or transverse displacement and the depressions key the lining against arcuate displacement when the lining is applied to the drum.

4 Claims, 4 Drawing Figures

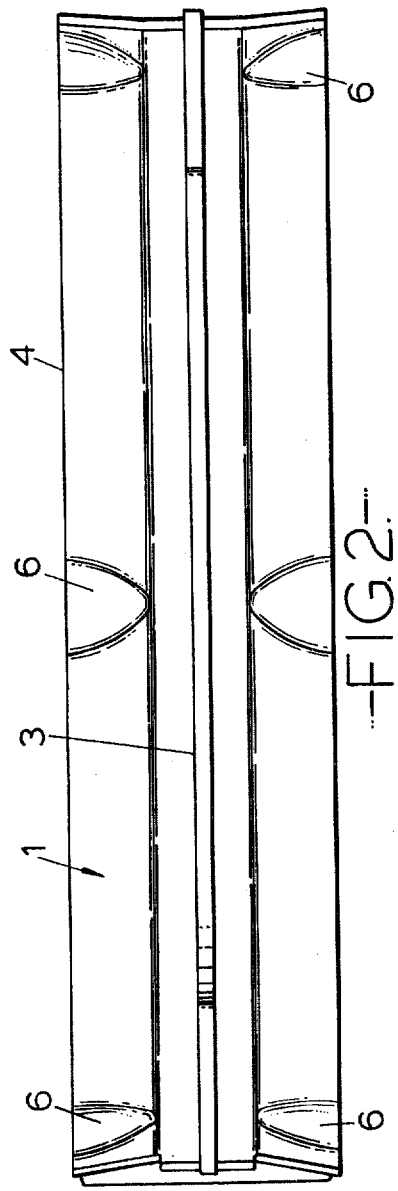
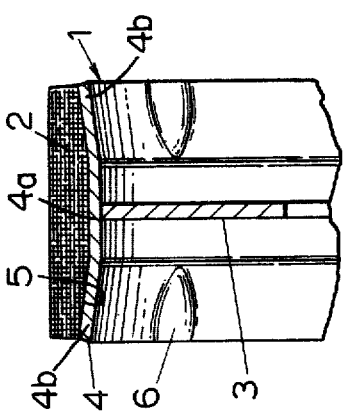
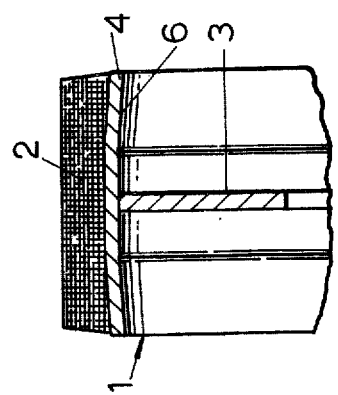

BRAKE SHOES

This is a continuation of application Ser. No. 281,404, filed Aug. 17, 1972, now abandon which in turn is a continuation of application Ser. No. 82,703 filed Oct. 21, 1970, now abandon.

BACKGROUND OF THE INVENTION

The present invention concerns brake shoes for internal shoe drum type brakes.

A brake shoe comprises a friction lining and an arcuate carrier. In order to get a reliable connection between the lining and the carrier, the lining is normally rivetted to the carrier. However, this has certain disadvantages in that the lining has to be ground before and after riveting to the carrier to give the desired profile. Also for the rivets to obtain a reasonable grip on the lining the rivets have to be rather long and a large amount of the lining has to be wasted towards the end of the lining's life to avoid the rivets marking the brake drum.

It has been proposed to bond or integrally mould the lining onto the carrier but this has the disadvantage that the interface between lining and the carrier is subjected during braking to a shear force in both the peripheral or arcuate and axial or transverse directions and if the bond between the carrier and the lining fails there would be a hazard to the vehicle.

SUMMARY OF THE INVENTION

According to one aspect of the present invention there is provided a brake shoe for use in a drum brake comprising a brake lining and a generally arcuate carrier therefor, the carrier where it supports the brake lining having a cross-section such that the lining is keyed to the carrier to prevent relative movement in the transverse direction and having at least one portion which is deformed radially inwardly by an unbroken depression to key the lining to the carrier to prevent relative movement in the arcuate direction.

The keying of the lining to the carrier both transversely and in the arcuate direction removes the shear stresses from the bond at the interface between the lining and the carrier.

The brake shoe normally will have a stiffening web or pair of stiffening webs on its inner arcuate surface to give the desired stiffness and also to allow for mounting of the brake shoe in a brake drum. Moreover it seems better to key the lining to the carrier by means of a concave outer surface and radially inwardly deformed portions.

An embodiment of the invention will now be described, by way of example, with reference to the accompanying drawings.

THE DRAWINGS

FIG. 2 is a view of the brake shoe of FIG. 1 from below,

FIG. 3 is a section along line A—A of FIG. 1, and

FIG. 4 is a section along line B—B of FIG. 1.

DETAILED DESCRIPTION OF AN EMBODIMENT

Figure 1:
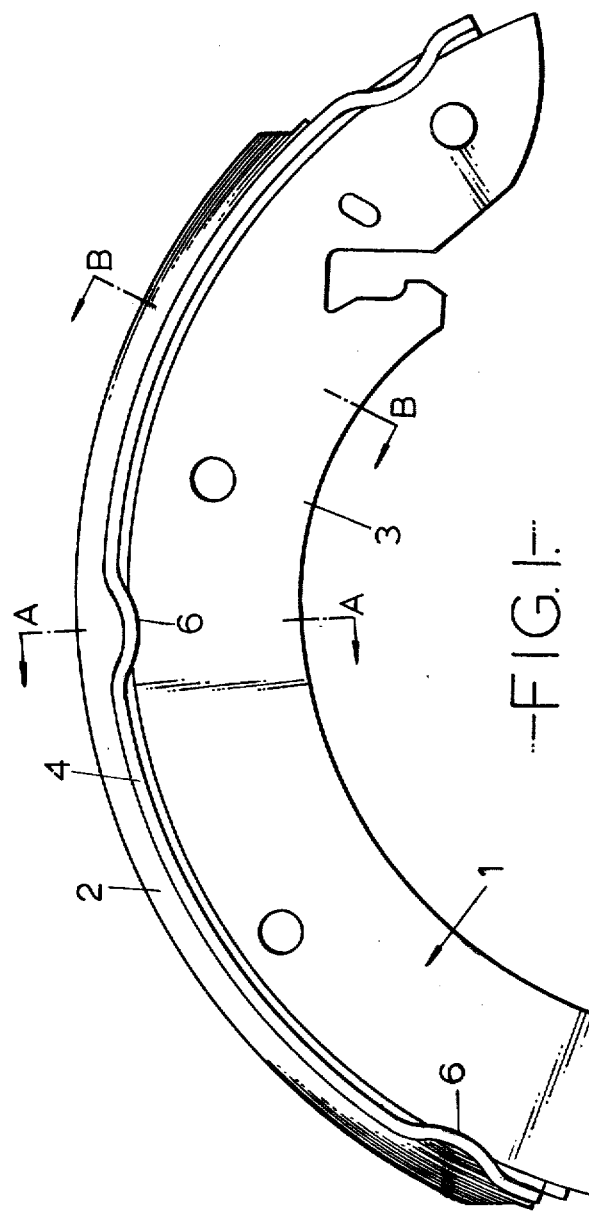
FIG. 1 is a side view of a brake shoe.

A brake shoe consists of a carrier 1 and a lining 2 and is to cooperate with a cylindrical brake drum (not shown). The outer surface of the lining is transversely flat and circumferentially part-cylindrical for efficient contact of the lining with the brake drum and the carrier is therefore made to extend generally arcuately.

The carrier has at least one web 3 having holes and a slot for the return springs and operating mechanism of the brake (not shown).

This web acts as a stiffening member of the carrier and the remainder of the carrier is in the form of a brake lining carrier platform member 4 on which the brake lining 2 is directly moulded. As can be seen in FIGS. 3 and 4, the lining is wholly between the edges of the platform member and has edges which taper inwardly in cross-section being broader nearer the platform member. The outer arcuate surface of the platform member has a flat central portion 4a and inclined wings 4b so as to be generally concave in cross-section (FIG. 4) and present a shallow trough 5 into which the brake lining will key itself in the direction transverse to the brake shoe. The amount of concavity is small. In addition, spaced along the arcuate length of the platform wings are a number of radially inwardly deformed unbroken depressions 6. These provide keying of the lining to the carrier in the arcuate direction while not interfering with the flat central portion 4a of the platform.

It will be appreciated that axial and peripheral stresses tending to shear the lining from the carrier only occur during braking when the lining is being urged against the carrier and the shallow nature of the keying recesses is quite adequate for its purpose as the lining cannot ride up out of the keying recesses.

A brake shoe embodying the invention can be designed to have many advantages. By a selection of a suitable lining material which can be accurately moulded onto the lining it is possible to avoid the necessity for a final grinding operation. The depressions also provide contact areas further from the brake drum for cooperation with guiding portions projecting from the brake back plate for guiding the edges of the brake shoes. In addition, the trough like nature of the arcuate outer surface of the platform member adds stiffness to the section and permits a lighter carrier to be used. The brake lining material in the trough, which is always wasted, adds rigidity and since brake lining material is usually cheaper than the steel used for the carrier this is an economic advantage especially since the slight amount of brake lining material in the trough is substantially less than the amount normally discarded on rivetted type brake shoes which amount cannot be regarded as stiffening the shoe. The lining is, of course, firmly backed, that is supported, over its entire area. Two final advantages are concerned with the inclined wings of the carrier member which give a more accurate indication of the amount of lining material available for wear and also, if the lining material is allowed to wear down to bring the carrier into contact with the brake drum, the contact is between these edges and the brake drum so that any score marks are disposed alongsidee rather than within the smooth friction surface provided by the path except by the linings on the drum with the result that the brakes will not tend to seize up after fitting new brake shoes. The tapering of the edges of the lining provides clearances between any score marks and a new lining.

It has also been found that brake shoes made in accordance with the invention have had less tendency to squeal than other shoes.

In this specification transverse means in a direction parallel to the axis of curvature of the brake shoe's carrier in other words parallel to the axis of the brake drum and radially means to or away from the centre of curvature of the brake shoe's carrier in other words radially of the brake drum.

I claim:

1. A brake shoe for use in an internal shoe drum brake comprising a rigid carrier generally arcuate in a peripheral direction and including a platform part and at least one web, said platform part being generally concave in transverse cross-section and including a flat central portion to which said web is attached, and outwardly sloping inclined wings, unbroken radial inward depression means in at least one of the wings, said depression means not extending transversely to the center of the platform part, and lining material attached to said platform part solely by direct moulding thereto, the outer surface of said lining material being transversely flat and with the inner portion occupying said concave cross-section and said depression means to key said lining material to said platform part against transverse and arcuate displacement when said material is applied by the carrier to a drum during application of the brake.

2. The brake shoe according to claim 1 in which the radial depression means is wholly within at least one of the wings.

3. A brake shoe according to claim 1 in which the radial depression means are in both wings.

4. A brake shoe according to claim 1 wherein the lining material has side edges which taper inwardly in cross-section so that said material is transversely broader nearer the platform part.

* * * * *